(12) United States Patent
Kora et al.

(10) Patent No.: US 10,648,585 B2
(45) Date of Patent: May 12, 2020

(54) PRESSURE CONTROL VALVE AND SUPERCRITICAL FLUID CHROMATOGRAPH

(71) Applicant: SHIMADZU CORPORATION, Kyoto-shi, Kyoto (JP)

(72) Inventors: Chihiro Kora, Kyoto (JP); Takao Okado, Kyoto (JP); Michiaki Owa, Kyoto (JP); Yosuke Iwata, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 54 days.

(21) Appl. No.: 16/072,921

(22) PCT Filed: Jan. 27, 2016

(86) PCT No.: PCT/JP2016/052304
§ 371 (c)(1),
(2) Date: Jul. 26, 2018

(87) PCT Pub. No.: WO2017/130316
PCT Pub. Date: Aug. 3, 2017

(65) Prior Publication Data
US 2019/0078697 A1    Mar. 14, 2019

(51) Int. Cl.
*F16K 25/00* (2006.01)
*G01N 30/32* (2006.01)
(Continued)

(52) U.S. Cl.
CPC ............ *F16K 25/005* (2013.01); *B01D 15/40* (2013.01); *F16K 7/16* (2013.01); *G01N 30/20* (2013.01); *G01N 30/32* (2013.01)

(58) Field of Classification Search
CPC . F16K 25/005; F16K 7/16; F16K 7/12; F16K 7/14; G01N 30/20; G01N 30/32; B01D 15/40
(Continued)

(56) References Cited

U.S. PATENT DOCUMENTS 4,070,004 A * 1/1978 Friswell .................... F16K 7/16
251/331
4,558,845 A * 12/1985 Hunkapiller ......... B01J 19/0046
137/606
(Continued)

FOREIGN PATENT DOCUMENTS

JP       9-292039 A    11/1997
JP    2014-520250 A    8/2014
(Continued)

OTHER PUBLICATIONS

Communication dated Mar. 7, 2019 issued by the State Intellectual Property Office of People's Republic of China in counterpart application No. 201680080009.5.
(Continued)

*Primary Examiner* — John Bastianelli
(74) *Attorney, Agent, or Firm* — Sughrue Mion, PLLC (57) ABSTRACT

A pressure control valve is provided with a pressure control block. The pressure control block has a pressure control block having an opening portion provided on one outer surface, a pressure control surface provided as a plane at a bottom portion of the opening portion, and two internal channels having openings at the respective end portions of the pressure control surface. A sheet-like valve body having elasticity and arranged so as to cover the pressure control surface is provided in the opening portion of the pressure control block. A valve body driving portion is provided on a side opposite to the pressure control surface with the valve body interposed therebetween that adjusts an amount of a
(Continued)

gap between the valve body and the pressure control surface by pressing the valve body in a direction perpendicular to the pressure control surface. The pressure control surface has higher hardness than a hard material.

6 Claims, 8 Drawing Sheets (51) Int. Cl.
    *F16K 7/16* (2006.01)
    *B01D 15/40* (2006.01)
    *G01N 30/20* (2006.01)

(58) Field of Classification Search
    USPC .............................. 251/331, 335.2, 368, 332
    See application file for complete search history.

(56) References Cited

U.S. PATENT DOCUMENTS

| | | | | |
|---|---|---|---|---|
| 4,828,219 A * | 5/1989 | Ohmi | ............... | F16K 7/14 251/118 |
| 4,860,793 A * | 8/1989 | Hartl | ............... | F16K 1/14 137/606 |
| 5,105,843 A * | 4/1992 | Condron | ............... | B01F 5/0405 137/13 |
| 5,112,027 A * | 5/1992 | Hanyu | ............... | F16K 7/16 251/274 |
| 5,413,311 A * | 5/1995 | Arstein | ............... | F16K 7/16 251/229 |
| 5,730,423 A * | 3/1998 | Wu | ............... | F16K 7/14 251/331 |
| 5,755,428 A * | 5/1998 | Ollivier | ............... | F16K 7/14 251/331 |
| 5,829,735 A | 11/1998 | Ikeda | | |
| 6,508,453 B2 * | 1/2003 | Mamyo | ............... | F16K 7/14 251/331 |
| 7,744,060 B2 * | 6/2010 | Sneh | ............... | F16K 7/14 251/331 |
| 2013/0048095 A1* | 2/2013 | Wikfors | ............... | F04B 11/0075 137/7 |
| 2014/0137967 A1 | 5/2014 | Chen et al. | | |
| 2016/0209377 A1 | 7/2016 | Goto et al. | | |

FOREIGN PATENT DOCUMENTS

| | | |
|---|---|---|
| WO | 2012/148794 A2 | 11/2012 |
| WO | 2015/029252 A1 | 3/2015 |

OTHER PUBLICATIONS

Communication dated Mar. 19, 2019 issued by the Japanese Patent Office in counterpart application No. 2017-563449.

Communication dated Sep. 12, 2019 issued by the State Intellectual Property Office of People's Republic of China in counterpart application No. 201680080009.5.

International Search Report for PCT/JP2016/052304 dated Apr. 26, 2016 [PCT/ISA/210].

Communication dated Aug. 7, 2019, from the Japanese Patent Office in counterpart application No. 2017-563449.

* cited by examiner

SUS316L
Time for delivering mobile phase: 0 hours

FIG.4B

SUS316L

Time for delivering mobile phase: 48 hours

FIG.5A

DLC Coating

Time for delivering mobile phase: 0 hours

FIG.5B

DLC Coating

Time for delivering mobile phase: 48 hours

FIG.5C

DLC Coating

Time for delivering mobile phase: 144 hours

FIG.5D

DLC Coating

Time for delivering mobile phase: 240 hours

FIG.5E

DLC Coating

Time for delivering mobile phase: 360 hours

FIG.5F

DLC Coating
Time for delivering mobile phase: 504 hours

FIG.6A

Low temperature nitriding treatment
Time for delivering mobile phase: 0 hours

FIG.6B

Low temperature nitriding treatment
Time for delivering mobile phase: 48 hours

FIG.6C

Low temperature nitriding treatment
Time for delivering mobile phase: 144 hours

FIG.6D

Low temperature nitriding treatment
Time for delivering mobile phase: 240 hours

PRESSURE CONTROL VALVE AND SUPERCRITICAL FLUID CHROMATOGRAPH

CROSS REFERENCE TO RELATED APPLICATIONS

This application is a National Stage of International Application No. PCT/JP2016/052304, filed on Jan. 27, 2016.

TECHNICAL FIELD

The present invention relates to a pressure control valve and a supercritical fluid chromatograph using the pressure control valve.

BACKGROUND ART

In recent years, supercritical fluid chromatography (hereinafter SFC) has been gaining attention. The SFC is chromatography that is performed by applying constant temperature and pressure to carbon dioxide or the like to obtain a supercritical fluid, and by using the supercritical fluid as a solvent. Supercritical fluid has characteristics of both liquid and gas, and is characterized by being more diffusive and less viscous than liquid. Using such a supercritical fluid as a solvent allows fast, high-separation, high-sensitivity analysis.

In supercritical fluid chromatograph, liquid carbon dioxide is used for a mobile phase. At this time, a modifier (organic solvent, mainly methanol) is added for the purpose of adjusting the degree of separation of a sample, and the mixed liquid is delivered. In order to keep the mobile phase carbon dioxide in a liquid state, it is necessary to set the pressure in the system to 10 MPa or more. For this reason, in the SFC device, a pressure control valve for maintaining the channel system at a constant pressure of 10 MPa or more is provided at a later stage of an analytical column.

By connecting a mass spectrometry (MS) to an SFC to realize a structure of SFC-MS, the detection sensitivity and the identification sensitivity may be increased. In the case of the structure of SFC-MS, the MS is connected to a downstream side of a pressure control valve, and components to be examined, which have been separated in time by a separation column, inevitably pass through the pressure control valve. When a dead volume not included in the flow path of a mobile phase exists in the pressure control valve, the mobile phase stagnates in the dead volume and the components which have been separated in time by the separation column get mixed together, and accurate analysis of the mixed components by the MS is disabled.

Therefore, a pressure control valve that can perform pressure control with high resolution while reducing the dead volume of the pressure control space by finely controlling the gap between the membrane and the plane has been proposed (See Patent Document 1).

PRIOR ART DOCUMENT

Patent Document

Patent Document 1 WO2015/029252 A1

SUMMARY OF THE INVENTION

Problems to be Solved by the Invention

The pressure control valve has a bore hole having a planar bottom surface formed in a block (hereinafter referred to as a pressure control block) provided with an inlet channel and an outlet channel, and end portions of the inlet channel and the outlet channel are provided as openings on the bottom surface. The bottom surface of the bore hole is covered with a film-like valve body having elasticity, and a gap generated between the bottom surface of the bore hole and the valve body constitutes a pressure control space for controlling a pressure. By finely adjusting this gap amount by an actuator, the pressure in the system of the supercritical fluid chromatograph is controlled.

In the supercritical fluid chromatograph, since the pressure in the system becomes a high pressure of 10 MPa or more and a later stage of the pressure control valve is at atmospheric pressure, carbon dioxide may be vaporized due to a steep drop in the pressure of a mobile phase and is instantly cooled by the heat of vaporization, thereby generating dry ice. When the plane of the block facing the valve body is damaged by these effects, the gap between the valve body and the block plane becomes large, and even when the valve body is pressed toward the block plane side, the pressure in the system cannot be controlled to a desired pressure. Therefore, the valve body of the pressure control valve and the plane of the pressure control block facing the valve body need to be excellent not only in chemical resistance but also in impact resistance.

In order to prevent the above problems, a hard material such as SUS316L may be used as a pressure control block. The hard material such as SUS316L has sufficient resistance to the pressure in the system and generation of dry ice, and impact due to driving of the valve body. Therefore, it has been thought that, when the hard material such as SUS316L is used as the material of the pressure control block, a pressure control block having sufficient durability could be formed.

However, it has been found that even when a pressure control block is formed of a hard material such as SUS316L, the pressure control block is damaged for some reason, whereby the pressure control function of the valve decreases with time. When the pressure control block is damaged and its damage becomes severe, it is impossible to control the inside of the system to a desired pressure by driving the valve body, and it becomes necessary to replace the pressure control block.

Therefore, it is an object of the present invention to suppress the damage of the pressure control block and to reduce the frequency of replacing pressure control blocks.

Solutions to the Problems

The pressure control valve according to the present invention includes a pressure control block having an opening portion provided on one outer surface, a pressure control surface provided as a plane at a bottom portion of the opening portion, and two internal channels having openings at the respective end portions of the pressure control surface, a sheet-like valve body having elasticity and arranged so as to cover the pressure control surface, and a valve body driving portion provided on a side opposite to the pressure control surface with the valve body interposed therebetween that adjusts an amount of a gap between the valve body and the pressure control surface by pressing the valve body in a direction perpendicular to the pressure control surface, wherein the pressure control surface is made of a material having higher hardness than a hard material having impact resistance and abrasion resistance.

Here, the "hard material" refers to a material excellent in impact resistance and abrasion resistance used as a base material of a pressure control valve of a supercritical fluid chromatograph, such as SUS316L, for example.

The supercritical fluid chromatograph according to the present invention includes an analysis channel, a mobile phase liquid supply portion for supplying a mobile phase to the analysis channel, a sample introduction portion for introducing a sample into the analysis channel, a separation column arranged on a downstream side of the sample introduction portion on the analysis channel, a detector arranged on a downstream side of the separation column on the analysis channel and detecting a sample component separated by the separation column, and the pressure control valve of the present invention arranged on a downstream side of the detector on the analysis channel and controlling a pressure in the analysis channel to a pressure at which the mobile phase is in a supercritical state.

Effects of the Invention

In the system of the supercritical fluid chromatograph, it is controlled to 40 MPa at maximum, but at the outlet of the pressure control valve, the pressure of the fluid decreases from such a high pressure to the atmospheric pressure all at once, the carbon dioxide vaporizes to generate bubbles, and so-called cavitation occurs, which the bubbles burst. The impact of this cavitation is transmitted to the pressure control surface through the modifier in the fluid, so that the pressure control surface is damaged, so-called erosion occurs, and as time passes, a groove for communicating between the openings (the end portions of an internal channel) provided on the pressure control surface by the erosion is formed. It was found that such a phenomenon occurs even when a hard material such as SUS316L is used as the material of the pressure control block.

In the pressure control valve of the present invention, the pressure control surface has higher hardness than the hard material such as SUS316L. As a result, resistance to cavitation is improved, erosion due to cavitation is suppressed, and the frequency of replacing pressure control blocks can be reduced.

In the supercritical fluid chromatograph of the present invention, since the pressure control valve is provided as a pressure control valve for controlling the pressure in the analysis channel to a pressure at which the mobile phase is in the supercritical state, the frequency of replacing pressure control blocks of the pressure control valve is reduced and the cost can be reduced.

EMBODIMENTS OF THE INVENTION

The pressure control surface of the pressure control valve according to the present invention is preferably HV 1000 or more. The Vickers hardness of SUS316L is HV 200 or less. Therefore, by setting the pressure control surface to HV 1000 or more, the pressure control surface has a remarkably higher hardness than SUS316L, and even higher resistance to cavitation is obtained.

Furthermore, the pressure control surface of the pressure control valve according to the present invention is preferably HV 2000 or more, as even higher resistance to cavitation is obtained.

An example of such a pressure control surface is a film coated with a DLC (diamond-like carbon) film. Although the hardness of the DLC film depends on its film thickness and the like, it is known that it has a hardness of HV 2000 or more in terms of Vickers hardness.

It is preferable that the pressure control block is made of a hard material. When the hardness of a base material for forming the DLC film is high, the base material is hardly deformed and the DLC film is hardly peeled off, thus the durability of the DLC film is improved.

The pressure control valve according to the present invention is intended to cope with cavitation caused by bursting of bubbles of a modifier in a mobile phase delivered under high pressure conditions. It is therefore preferable to be provided in a channel that delivers a mixed liquid of a modifier and liquid carbon dioxide as a mobile phase for controlling a pressure in the channel to a pressure at which the mobile phase is in a supercritical state.

Figure 1:
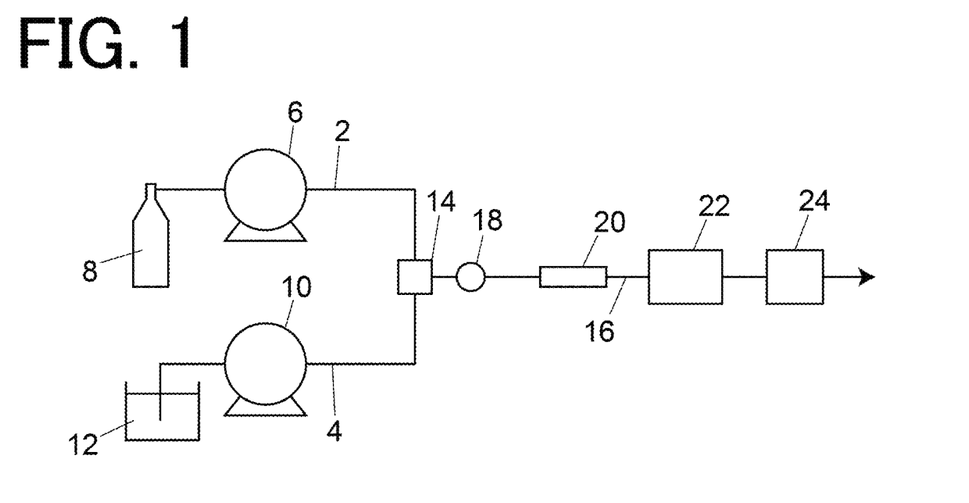
FIG. 1 is a channel diagram schematically showing an example of a supercritical fluid chromatograph.

FIG. 1 is a channel diagram schematically showing an example of a supercritical fluid chromatograph.

A carbon dioxide delivery channel 2 for delivering liquid carbon dioxide by a pump 6 and a methanol delivery channel 4 for delivering methanol as a modifier by a pump 10 are connected to a mixer 14. An analysis channel 16 is connected to the mixer 14. On the analysis channel 16, a sample injection portion (auto sampler) 18 for injecting a sample into the analysis channel 16, a separation column 20, a detector 22, and a pressure control valve 24 are disposed.

Carbon dioxide and methanol are mixed in the mixer 14 and introduced into the analysis channel 16 as a mobile phase. The carbon dioxide delivery channel 2, the methanol delivery channel 4, and the mixer 14 constitute a mobile phase liquid delivery portion. The internal pressure of the analysis channel 16 is controlled to be 10 MPa or more by the pressure control valve 24, and the mobile phase introduced into the analysis channel 16 is in a state of supercritical fluid. The sample injected by the sample injection portion 18 is transported to the separation column 20 by the mobile phase that has become a supercritical fluid, separated for each component, and discharged to the outside via the detector 22 and the pressure control valve 24. A mass spectrometer (MS) may be connected to a later stage of the pressure control valve 24.

Figure 2:
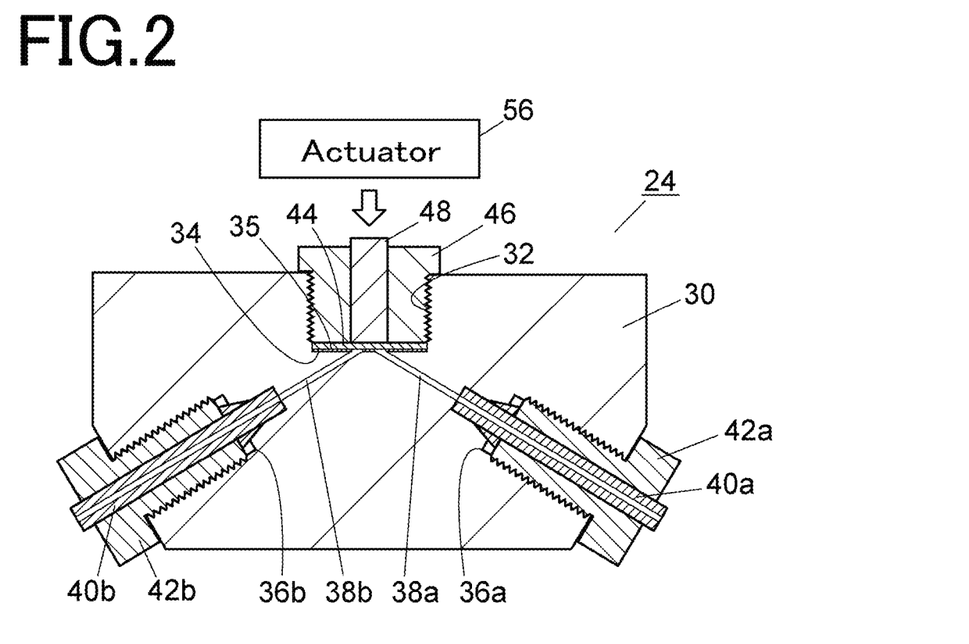
FIG. 2 is a cross-sectional view showing an embodiment of a pressure control valve.
Figure 3:
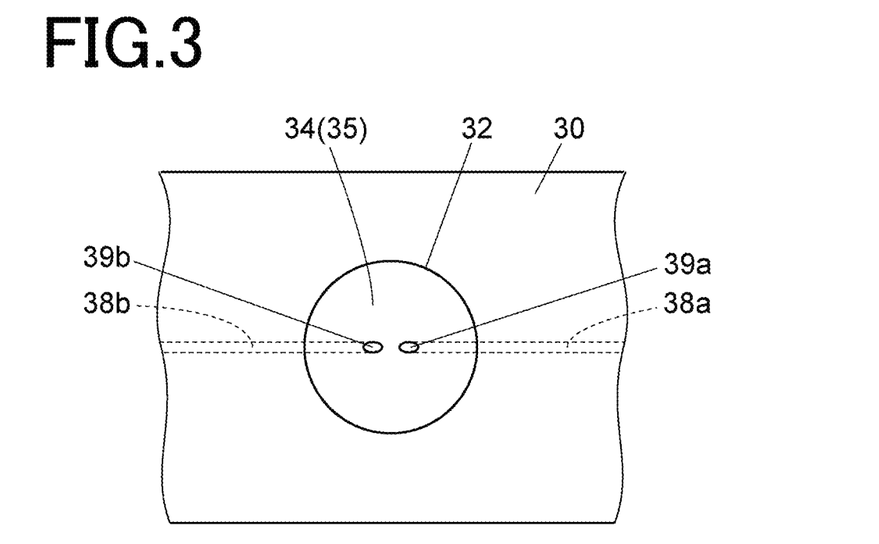
FIG. 3 is a top view of the inside of a bore hole of the pressure control valve of the same embodiment.

An embodiment of the pressure control valve 24 will be described with reference to FIGS. 2 and 3.

The pressure control valve 24 is provided with a pressure control block 30. The material of the pressure control block 30 is a hard material such as SUS316L which is excellent in chemical resistance and pressure resistance. A bore hole 32 is provided being bored cylindrically and perpendicularly to one outer surface of the pressure control block 30. The inner diameter of the bore hole 32 is, for example, about 6 mm.

Edge portions of opposing side surfaces of the pressure control block 30 are tapered, and pipe connection portions 36a and 36b are provided at respective tapered portions. An end portion of a pipe 40a is fixed to the pipe connection portion 36a by a fixing member 42a formed from a ferrule and a male nut. In the same manner, an end portion of a pipe 40b is fixed to the pipe connection portion 36b by a fixing member 42b formed from a ferrule and a male nut. A mobile phase flows in through the pipe 40a, and flows out through the pipe 40b.

The pressure control block 30 includes an internal channel 38a that communicates with the pipe connection portion 36a, and an internal channel 38b that communicates with the pipe connection portion 36b. End portions of the internal channels 38a and 38b reach the center portion of a planar pressure control surface 34 of the bore hole 32, and form two openings 39a and 39b at the pressure control surface 34 of the bore hole 32 (see FIG. 3B). The pipes 40a and 40b communicate with the pressure control surface 34 via the internal channels 38a and 38b, respectively.

DLC coating is applied to the pressure control surface 34 inside the bore hole 32, and a DLC film 35 having a film thickness of about 3 μm is formed on the surface thereof. The DLC film 35 is formed in an arc discharge plasma by introducing C6H6 gas into a vacuum.

A disc-shaped valve body 44 is disposed on the pressure control surface 34 inside the bore hole 32. The valve body 44 is made of resin such as PBT (polybutylene terephthalate), PEEK (polyether ether ketone) or ultra high molecular weight polyethylene, having chemical resistance, impact resistance, and pressure resistance. The valve body 44 covers the entire pressure control surface 34, and its peripheral edge portion is pressed toward the pressure control surface 34 side by a sealing member 46.

The sealing member 46 is a cylindrical member having a through hole at the center portion, and a thread is formed on its outer circumferential surface. A thread for being engaged with the thread on the outer circumferential surface of the sealing member 46 is formed on the inner circumferential surface of the bore hole 32. By rotating the sealing member 46, the sealing member 46 can be vertically moved inside the bore hole 32. A tip end surface, inserted in the bore hole 32 of the sealing member 46, is in contact with the peripheral edge portion of the valve body 44, and presses the peripheral edge portion of the valve body 44 against the pressure control surface 34. The sealing member 46 may be made of a hard material with certain hardness such as PEEK resin or stainless steel, in order to press the valve body 44 toward the bore hole 32 side.

A pressing rod 48 penetrates the through hole at the center of the sealing member 46. A tip end of the pressing rod 48 is in contact with the center portion of the valve body 44. The pressing rod 48 is driven along one direction (vertical direction in the drawing) by an actuator 56. Examples of the actuator 56 include a combination of a stepping motor and a piezo element.

According to this pressure control valve 24, a small gap is formed between the center portion of the pressure control surface 34 and the valve body 44 by a pressure from a mobile phase flowing in from the pipe 40a, and the mobile phase flows through the gap. By controlling the gap amount between the center portion of the pressure control surface 34 and the valve body 44 by the actuator 56, the pressure inside the channel at the upstream side of the pressure control valve 24 is controlled.

With the pressure control valve 24, the height of the gap between the pressure control surface 34 and the valve body 44 in a state where the pressure inside the upstream channel is maintained at 10 MPa or more is about several micrometers, and its internal volume is 1 μL or less. Therefore, the pressure may be controlled with high accuracy in a state where a minute amount of mobile phase is made to flow. Further, since the peripheral edge portion of the valve body 44 is sealed by being pressed against the bottom surface 34, there is almost no dead volume to be a stagnation point of the mobile phase.

In this embodiment, since the pressure control surface 34 of the pressure control block 30 is coated with the DLC film 35, the hardness of the pressure control surface 34 is increased, the resistance to cavitation generated in the pressure control block 30 is improved, and generation of erosion on the pressure control surface 34 is suppressed.

As a result of measuring the hardness of the DLC film having a film thickness of about 3 μm formed on the surface of SUS316L by nanoindentation method, the hardness was 51.5 [GPa]. In the hardness measurement by the nanoindentation method, an acute angle indenter was pushed into the DLC film with a strength of 9.8 [mN], and the resistance force at that time was calculated as hardness. It is said that the hardness measured by the nanoindentation method can calculate the approximate Vickers hardness by multiplying the numerical value by 50, thus it has been found that the DLC film with a film thickness of 3 μm has a hardness equivalent to HV 2500.

Since the hardness of SUS316L is HV 200 or less, by coating the pressure control surface 34 with a DLC film, 10 times or more hardness can be obtained as Vickers hardness.

Figure 4A:
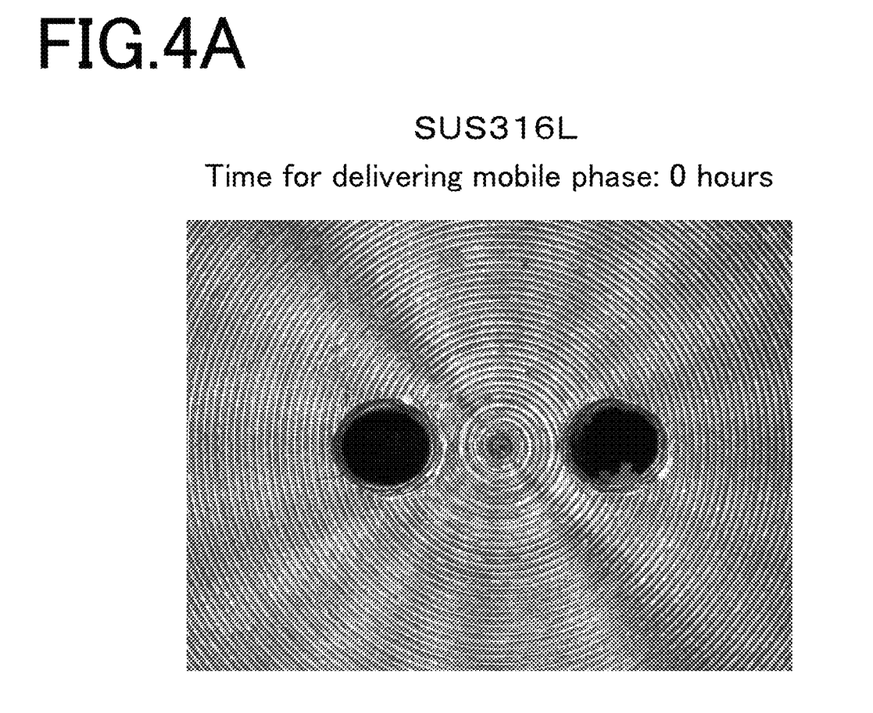
FIG. 4A is an image showing the state of a pressure control surface where SUS316L is exposed before delivering a mobile phase.
Figure 4B:
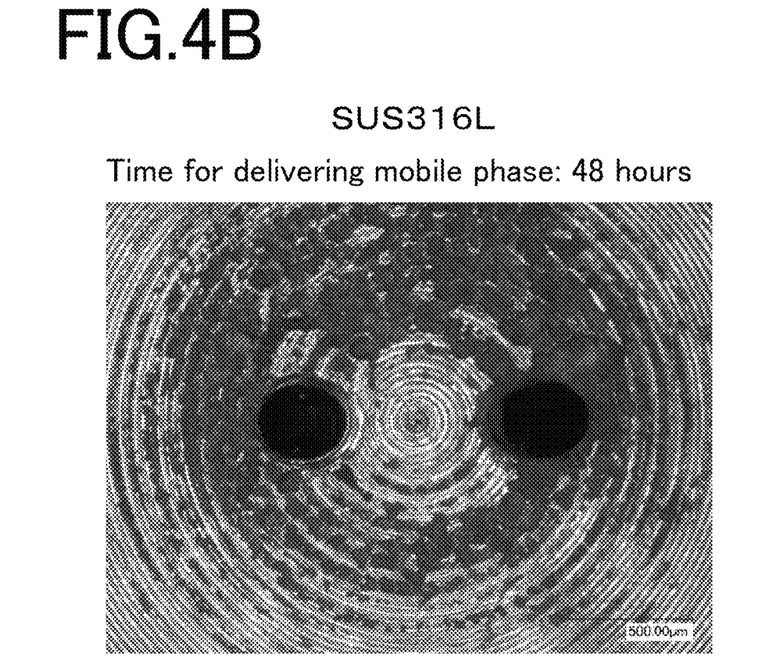
FIG. 4B is an image showing the state of the pressure control surface where SUS316L is exposed after delivering the mobile phase for 48 hours.

FIGS. 4A and 4B are images showing the state of the pressure control surface 34 where SUS316L is exposed (not coated with the DLC film). FIG. 4A shows the state before delivering a mobile phase, and FIG. 4B shows the state after delivering the mobile phase continuously for 48 hours. In this experiment, a mixed solution of liquid carbon dioxide and methanol (concentration: 30%) was used as the mobile phase and the flow rate was set to 2 mL/min. Incidentally, the arcuate pattern appearing in this image is a machining trace at the time of forming a bore hole 32.

As shown in FIG. 4B, in the state where SUS316L is exposed to the pressure control surface 34, when the mobile phase is continuously delivered for 48 hours, erosion occurs on the pressure control surface 34 due to the influence of cavitation in the mobile phase, and a number of recesses are formed in succession to form a groove for communicating between two holes (39a and 39b (see FIG. 3)). In such a state, even when the valve body 44 is pressed against the pressure control surface 34, the pressure in the system cannot be controlled to a desired pressure, and the pressure control block 30 needs to be replaced.

Figure 5A:
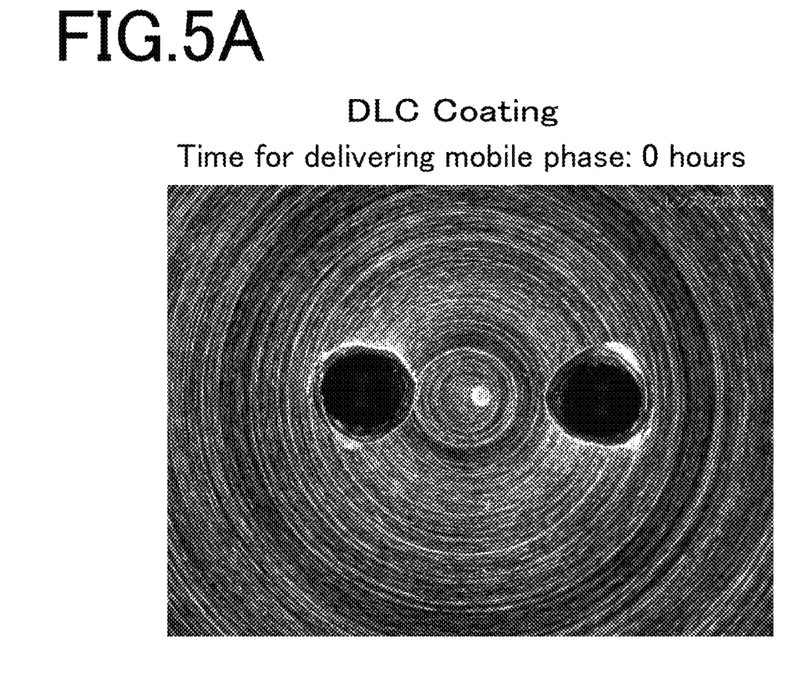
FIG. 5A is an image showing the state of a pressure control surface coated with DLC coating before delivering a mobile phase.
Figure 5B:
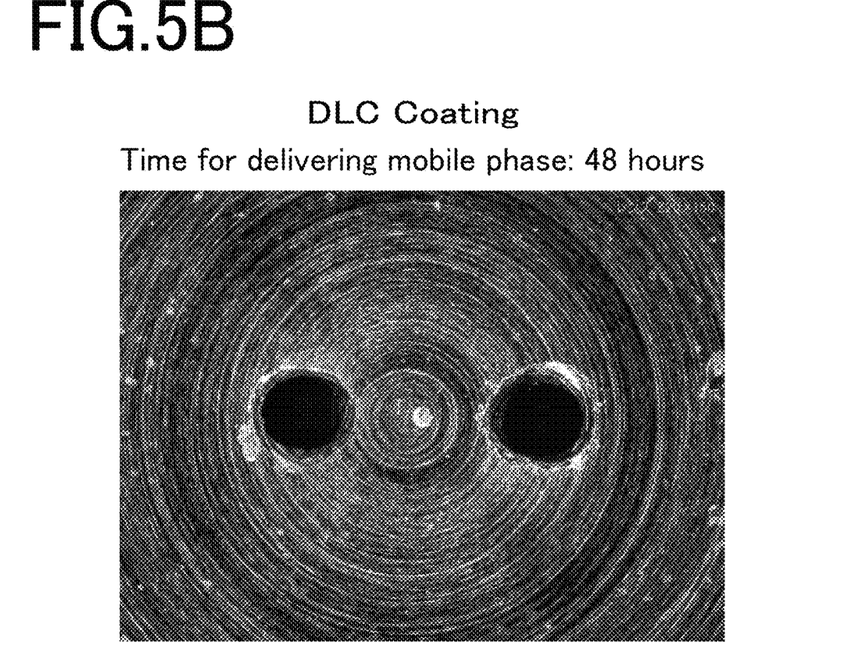
FIG. 5B is an image showing the state of the pressure control surface coated with DLC coating after delivering the mobile phase for 48 hours.
Figure 5C:
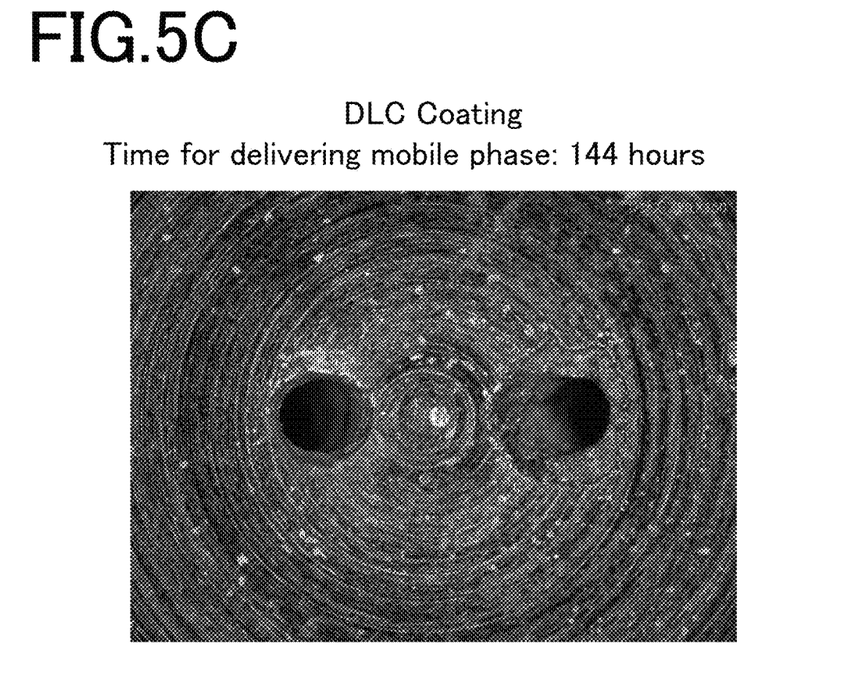
FIG. 5C is an image showing the state of the pressure control surface coated with DLC coating after delivering the mobile phase for 144 hours.
Figure 5D:
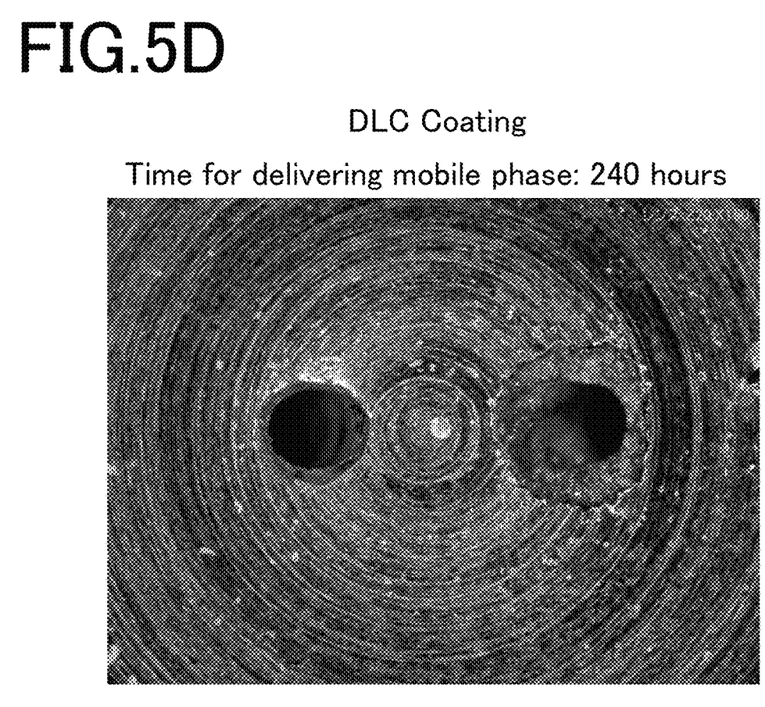
FIG. 5D is an image showing the state of the pressure control surface coated with DLC coating after delivering the mobile phase for 240 hours.
Figure 5E:
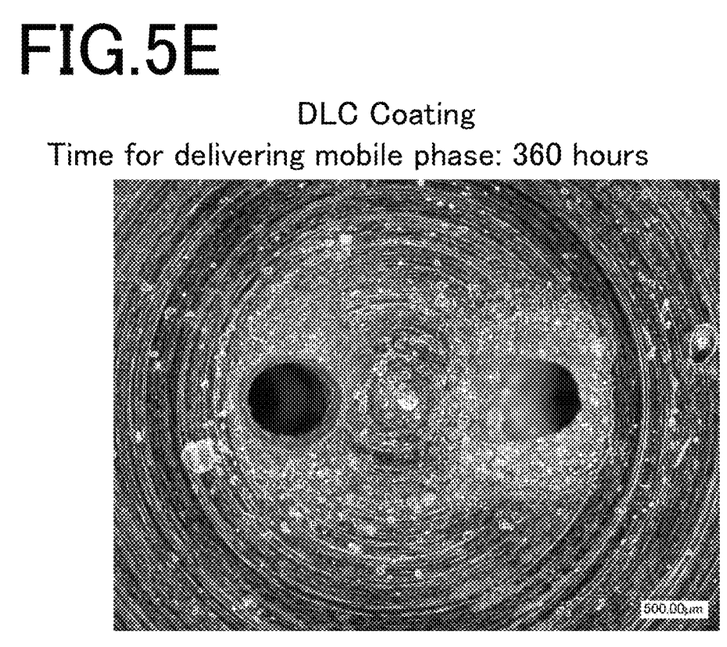
FIG. 5E is an image showing the state of the pressure control surface coated with DLC coating after delivering the mobile phase for 360 hours.
Figure 5F:
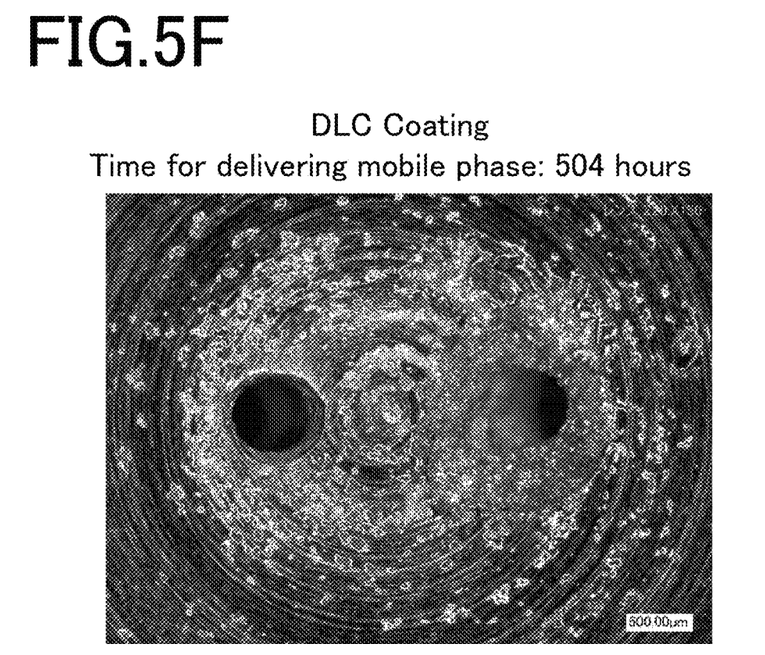
FIG. 5F is an image showing the state of the pressure control surface coated with DLC coating after delivering the mobile phase for 504 hours.

FIGS. 5A to 5F are images showing the state of the pressure control surface 34 coated with the DLC film 35. FIG. 5A shows the state before delivering a mobile phase, FIG. 5B shows the state after delivering the mobile phase continuously for 48 hours, FIG. 5C shows the state after delivering the mobile phase continuously for 144 hours, FIG. 5D shows the state after delivering the mobile phase continuously for 240 hours, FIG. 5E shows the state after delivering the mobile phase continuously for 360 hours, and FIG. 5F shows the state after delivering the mobile phase continuously for 504 hours. The experimental conditions are the same as in the experiments in FIGS. 4A and 4B described above.

When the pressure control surface 34 is coated with the DLC film 35, as shown in FIGS. 5B to 5D, it is understood that almost no erosion occurs on the pressure control surface 34 even after continuously delivering the mobile phase for 240 hours. Then, as shown in FIG. 5E, after delivering the mobile phase for 360 hours, although a certain degree of erosion is observed, a groove for communicating the two holes has not been formed yet.

Therefore, by coating the pressure control surface 34 with the DLC film 35, durability to withstand delivering of the mobile phase of at least 360 hours is obtained under this experimental condition. In general, the time required for one analysis in a supercritical fluid chromatograph is about 3 minutes. Therefore, when analysis is carried out under the same conditions as this experimental condition, the pressure control block 30 coated with the DLC film 35 on the pressure control surface 34 can withstand at least 7200 analyses, and the frequency of replacing the pressure control blocks 30 can be reduced, as compared to the case where the SUS316L is exposed to the pressure control surface 34.

Incidentally, examples of a method for improving resistance to cavitation include a method of applying low temperature nitriding treatment to the pressure control surface 34, in place of the DLC coating. The normal nitriding treatment is a treatment of heating at about 600° C. in a state where the pressure control surface 34 of the pressure control block 30 made of SUS316L is exposed to the NH3 atmosphere, whereas the low temperature nitriding treatment is a treatment of heating at the temperature of the latter half of 300° C. by applying a fluoride film on the base material before exposing the pressure control surface 34 of the pressure control block 30 made of SUS316L to the NH3 atmosphere. As a result, the abrasion resistance of the pressure control surface 34 is improved and the hardness is improved to about HV 1000 to 1200. In addition, by performing this low temperature nitriding treatment twice, the hardness is improved to about HV 1300.

Figure 6A:
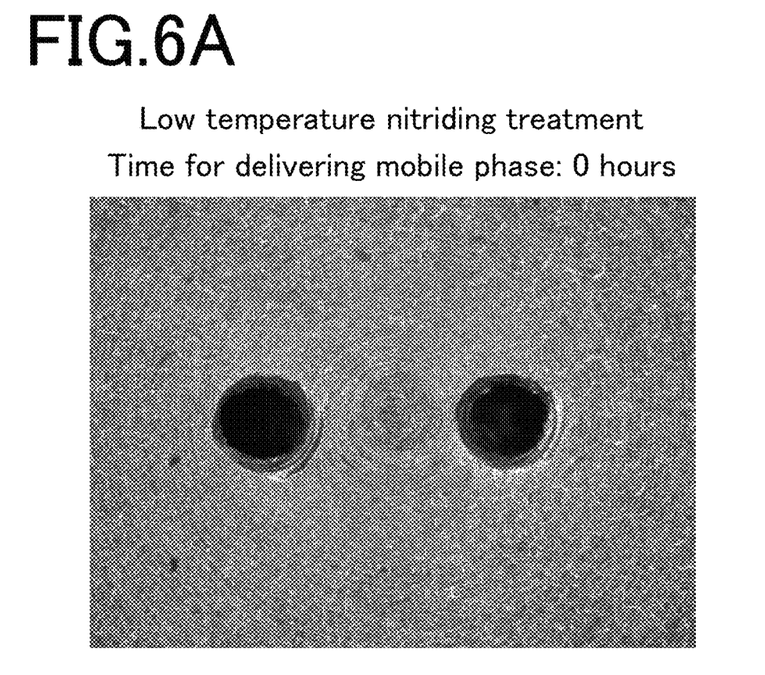
FIG. 6A is an image showing the state of a pressure control surface applied with nitriding treatment before delivering a mobile phase.
Figure 6B:
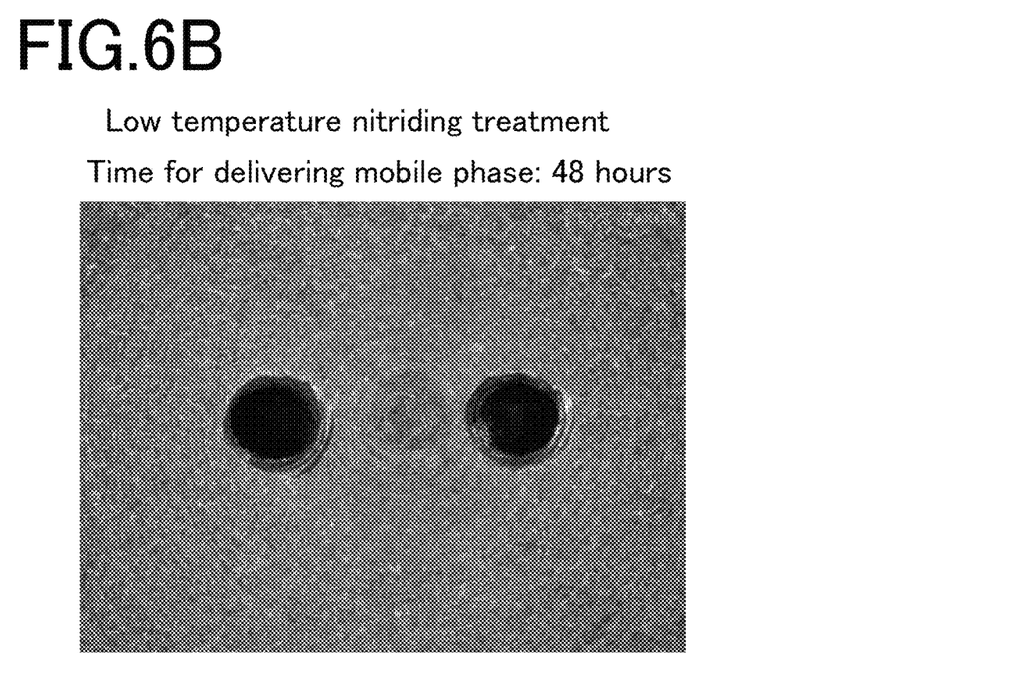
FIG. 6B is an image showing the state of the pressure control surface applied with nitriding treatment after delivering the mobile phase for 48 hours.
Figure 6C:
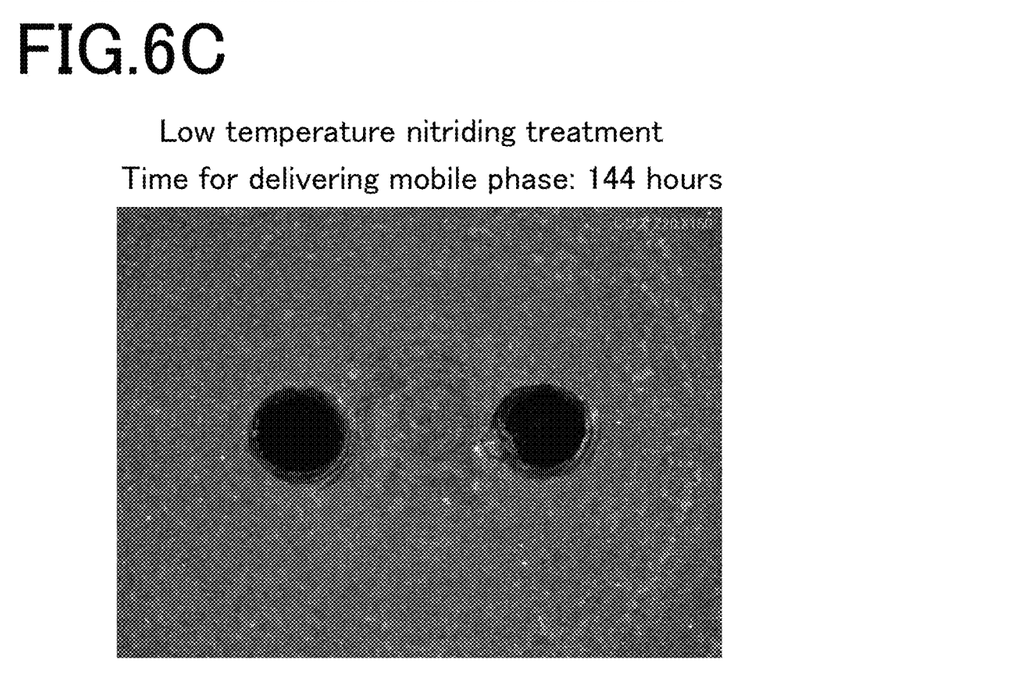
FIG. 6C is an image showing the state of the pressure control surface applied with nitriding treatment after delivering the mobile phase for 144 hours.
Figure 6D:
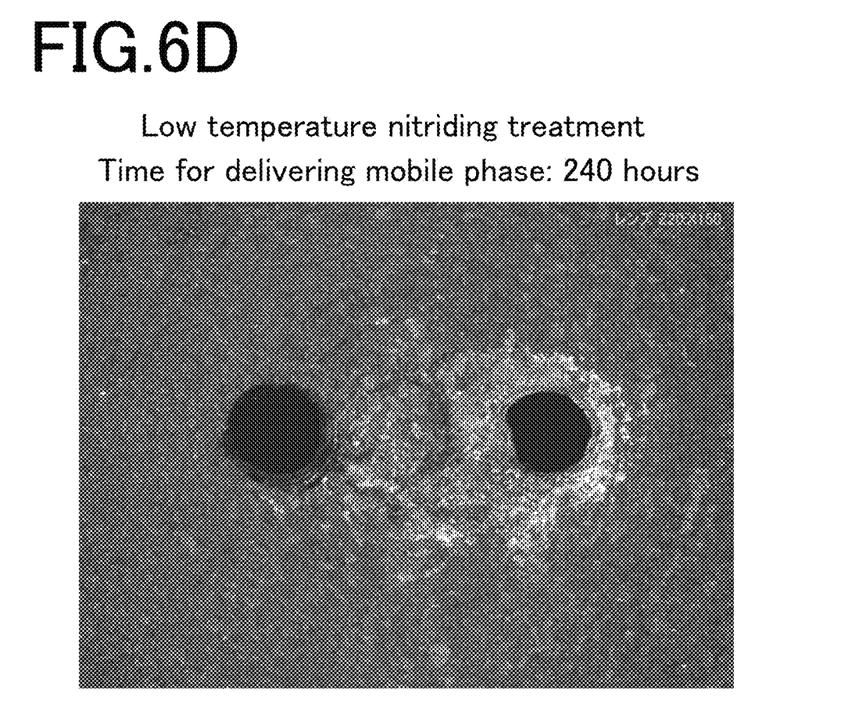
FIG. 6D is an image showing the state of the pressure control surface applied with nitriding treatment after delivering the mobile phase for 240 hours.

FIGS. 6A to 6D are images showing the state of the pressure control surface 34 applied with low temperature nitriding treatment. FIG. 6A shows the state before delivering a mobile phase, FIG. 6B shows the state after delivering the mobile phase continuously for 48 hours, FIG. 6C shows the state after delivering the mobile phase continuously for 144 hours, and FIG. 6D shows the state after delivering the mobile phase continuously for 240 hours. The experimental conditions are the same as the experiments in FIGS. 4A, 4B, and 5A to 5F described above.

From these images, almost no erosion occurs on the pressure control surface 34 applied with low temperature nitriding treatment even after delivering the mobile phase for 144 hours. However, after delivering the mobile phase for 240 hours, erosion occurs on the pressure control surface 34 to form a groove for communicating between the two holes. From this, it is possible to improve the resistance to cavitation by applying low temperature nitriding treatment to the pressure control surface 34, although it is inferior to the DLC coating.

The inventors of the present invention performed experiments also for the case where SUS316L of the pressure control surface 34 was subjected to a pionite treatment to form solid solution diffusion of carbon in the austenitic structure at a temperature of 500° C. or lower, and the case where an electroless nickel coating was applied to the pressure control surface 34, and it has been found that improvement in cavitation resistance is observed as compared to the case where SUS316L was used as it was. The hardness of pionite is about HV 800 to 900, and the electroless nickel coating is about HV 500, both of which have higher hardness than SUS316L. However, it cannot be said that it is sufficiently high as an effect of suppressing erosion accompanying cavitation.

From the above, it is desirable that the hardness of the pressure control surface 34 is HV 1000 or more, and in particular, it is desirable that a DLC coating having a hardness of HV 2000 or more is applied.

DESCRIPTION OF REFERENCE SIGNS

2: Carbon dioxide delivery channel
4: Methanol delivery channel
6, 10: Pump
8: Carbon dioxide
12: Methanol (Modifier)
14: Mixer
16: Analysis channel
18: Sample injection portion
20: Separation column
22: Detector
24: Pressure control valve
30: Pressure control block
32: Bore hole
34: Pressure control surface
35: DLC film
36a, 36b: Pipe connection portion
38a, 38b: Internal channel
40a, 40b: Pipe
42a, 42b: Fixing member
44: Valve body
46, 46a: Sealing member
48: Pressing rod
56: Actuator

The invention claimed is:

1. A supercritical fluid chromatograph comprising:
an analysis channel;
a mobile phase liquid delivery portion for delivering a mobile phase to the analysis channel;
a sample introduction portion for introducing a sample into the analysis channel;
a separation column arranged on a downstream side of the sample introduction portion on the analysis channel;

a detector arranged on a downstream side of the separation column on the analysis channel and detecting a sample component separated by the separation column; and a pressure control valve, arranged on a downstream side of the detector on the analysis channel and controlling a pressure in the analysis channel to a pressure at which the mobile phase is in a supercritical state, further comprising:

a pressure control block having an opening portion provided on one outer surface, a pressure control surface provided as a plane at a bottom portion of the opening portion, and two internal channels having openings at respective end portions of the pressure control surface;

a sheet-like valve body having elasticity and arranged so as to cover the pressure control surface; and a valve body driving portion provided on a side opposite to the pressure control surface with the valve body interposed therebetween, wherein the valve body driving portion is driven in a direction perpendicular to the pressure control surface so that an amount of a gap between the valve body and the pressure control surface is adjusted by pressing the valve body in the direction perpendicular to the pressure control surface, wherein the pressure control surface is made of a material having higher hardness than the hardness of SUS316L.

2. The pressure control valve according to claim 1, wherein the pressure control surface has a hardness of HV 1000 or more.

3. The pressure control valve according to claim 2, wherein the pressure control surface has a hardness of HV 2000 or more.

4. The pressure control valve according to claim 3, wherein the pressure control surface is covered with a DLC film.

5. The pressure control valve according to claim 4, wherein the pressure control block is made of a hard material.

6. The pressure control valve according claim 1, wherein the pressure control valve is provided in a channel that delivers a mixed liquid of a modifier and liquid carbon dioxide as a mobile phase for controlling a pressure in the channel to a pressure at which the mobile phase is in a supercritical state.

* * * * *